United States Patent Office 3,227,653
Patented Jan. 4, 1966

3,227,653
FLUORINE CONTAINING SPINEL-TYPE
FERRITES
Ephraim Heinrich Frei, Rehovoth, and Michael Schieber, Tel Aviv, Israel; said Frei assignor to Yeda Research & Development Co., Ltd., Rehovoth, Israel, a corporation of Israel; said Schieber assignor to The Weizmann Institute of Science, Rehovoth, Israel
No Drawing. Filed July 2, 1962, Ser. No. 207,021
11 Claims. (Cl. 252—62.5)

This invention relates to ferrimagnetic compositions known as ferrites, which consist basically of ferric oxide associated in the crystal lattice with other metal oxides.

By one of the conventional methods of classifying ferrites they are grouped into those of the magnetoplumbite, garnet and spinel types, according to their different crystal forms which are, respectively, the same as those of the three groups of minerals to which their designations allude. These three types of ferrites have different magnetic and electric properties owing to which they can be used for different technical purposes. It is found that numerous unpredictable variations of the properties and potential technical applications of ferrites can be produced by such changes in their empirical chemical composition as can be effected without alteration of their crystal form. Moreover, if changes in the empirical composition of any one of these types of ferrite produce certain variations of the properties of the material, no prediction can be made whether analogous changes can be made in the composition of the other two types of ferrite or, if they can be made, whether they produce analogous results. Even for one and the same type of ferrite no prediction is possible how the empirical composition can be changed and what would be the influence of any such change on the properties of the ferrite.

This invention is concerned with a group of single-phase spinel-type ferrites whose basic composition can be expressed by the empirical formula $$M_a^{++}Fe_b^{+++}\Delta_c O_{(4-x)} F_x$$

where $M^{++}$ is at least one bivalent metal cation, $\Delta$ is a cation vacancy in the crystal lattice and $a$, $b$, $c$ and $x$ are whole or fractional numbers fulfilling the equations $$a+b+c=3$$

and $$2a+3b=2(4-x)+x$$

Preferably the cation $M^{++}$ in the above basic formula is selected from the group consisting of $Mg^{++}$, $Zn^{++}$, $Cd^{++}$, $Cu^{++}$, $Mn^{++}$, $Fe^{++}$, $Ni^{++}$ and $Co^{++}$.

From the equation $a+b+c=3$ it follows that the total number of cations and cation vacancies in the lattice is 3 for each basic formula unit. The second equation $2a+3b=2(4-x)+x$ signifies that each basic formula unit is electrostatically balanced.

Where M stands for more than one bivalent cation, $a$ designates the total number of bivalent cations per basic formula.

The term "single-phase ferrite" is used in connection with this invention in order to define the compositions as consisting entirely of spinel crystals without being associated with appreciable quantities of other crystal phases, as ascertained by X-ray powder diffraction photographs.

The single-phase spinel-type ferrites according to the invention thus contain fluorine in a proportion of 4 to 12 percent of the weight of the ferrite, replacing an equivalent proportion of oxygen. The replacement occurs in the crystal lattice in that each atom of fluorine introduced takes the place of one atom of oxygen. In terms of percentage by weight, therefore, the addition of 4 to 12 percent of fluorine corresponds to a subtraction of about 3.4 to 10 percent of oxygen.

It is known that in spinel-type ferrites the unit cell, i.e. the smallest unit of material showing the characteristic properties of the material, comprises a multiple of the basic or empirical chemical formula unit, as a rule eight times the basic formula unit. Obviously, the atom-for-atom substitution of fluorine for oxygen refers to the unit cell and not to the basic formula unit, since with respect to the latter one atom of fluorine corresponds to 7 to 8% of the unit weight, while the present invention makes allowance for a fluorine content range from 4 to 12 percent. In other words, in the basic formulae of the fluorine-containing spinel-type ferrites according to the invention, the relative proportions of the constituents may be stoichiometric or non-stoichiometric, which applies not only to the fluorine content but also to the ratio $MO:Fe_2O_3$.

Fluorine-containing ferrites of the magnetoplumbite types are known. They can be manufactured in a comparatively simple way in that ferric oxide is fired together with the calculated amount of an alkaline-earth metal fluoride whereby a single ferrite phase is produced which contains iron, the alkaline-earth metal concerned, oxygen and fluorine. As compared with the magnetoplumbite ferrites containing the same metal components but no fluorine, those containing fluorine have certain advantages which increase their technical usefulness.

It has been suggested that spinel-type ferrites containing lithium fluoride and allegedly having the empirical formula $LiFe_2O_3F$ can be prepared by the direct firing of a mixture of ferric oxide and lithium fluoride in an atmosphere of oxygen. The conditions of reaction under which these lithium-fluoride ferrites have been stated to be produced are, however, not conducive to the introduction of fluorine into the composition of the spinel, even if the lithium metal is so introduced. Thus, while it has been reported that the spinel-type ferrite thus obtained, allegedly containing lithium fluoride, was ferrimagnetic. However, from theoretical considerations based on the octahedral preference of the lithium ion it follows that a spinel-type ferrite having the basic formula $LiFe_2O_3F$ must be anti-ferromagnetic.

The fluorine-containing spinel-type ferrites according to the invention cannot be prepared in the same simple way as can fluorine-containing magnetoplumbite-type ferrites, but special precautions or measures have to be taken, as otherwise all or most of the fluorine is lost in the course of the firing operation. Where the metal fluoride to be combined with ferric oxide does not contain water of crystallization, as in the case of, for example, magnesium, cadmium, copper and manganese fluorides, its mixture with ferric oxide can be fired directly on the condition that the starting materials and the atmosphere in which they are fired are completely dry and that the firing atmosphere contains little or no oxygen, and in any case less oxygen than is present in air. Preferably, the firing is performed in a substantially oxygen-free atmosphere of carbon dioxide, nitrogen or an inert gas such as helium, argon and the like.

Where the metal fluoride contains water of crystallization, as in the case of, for example, zinc, iron, nickel and cobalt fluorides, the direct firing method does not lead to the formation of the desired fluorine-containing spinel-type ferrites and an indirect method must be resorted to. In this case, an anhydrous metal-fluoride-ammonium-fluoride complex salt is first prepared. The complex salt can be fired directly in mixture with ferric oxide, or the complex salt may first be heated by itself whereby some ammonia is liberated, and the heated product is admixed with ferric oxide and the mixture is fired. This same "indirect" method can also be used where the metal salt used as a starting material is a hydrate of a halide other than fluoride. This can be converted into the metal-fluoride-ammonium-fluoride complex salt, e.g. by reaction with ammonium fluoride in a water-free liquid medium.

In the following Table I the properties of some of the new fluorine-containing spinel-type ferrites of this invention are compared with the properties of the corresponding ordinary ferrites.

TABLE I

[Unit cell dimensions $a$ (A.), saturation magnetization $n(\beta_1$ Bohr magnetrons/formula unit) or $\sigma$(e.m.$\mu$/g.) and Curie temperature Tc (° K.) of some spinel-type ferrites, with and without fluorine ions in their crystal structure]

| | $a$ (A.) 295° K. | $n$ ($\beta$) 90° K. | $\sigma$ (e.m.$\mu$/g.) 90° K. | $\sigma$ (e.m.$\mu$/g.) 295° K. | Tc (°K.) | $\Delta$ |
|---|---|---|---|---|---|---|
| $MgFe_2O_4$ | 8.36 | 1.1 | 30 | 25 | 713 | ---- |
| $Mg_{0.8}Fe_{2.0}O_{3.3}F_{0.7}$ | 8.36 | 2.2 | 64 | 50 | 693 | 0.2 |
| $MnFe_2O_4$ | 8.50 | 4.6 | 108 | 77 | 573 | ---- |
| $Mn_{0.4}Fe_{2.2}O_{3.3}F_{0.7}$ | 8.50 | 4.2 | 110 | 80 | 723 | 0.4 |
| $CoFe_2O_4$ | 8.38 | 3.7 | 86 | 75 | 793 | ---- |
| $Co_{0.8}Fe_{2.0}O_{3.3}F_{0.7}$ | 8.38 | 3.7 | 91 | 80 | 773 | 0.2 |
| $NiFe_2O_4$ | 8.34 | 2.3 | 53 | 46 | 858 | ---- |
| $Ni_{0.8}Fe_{1.8}O_{3.3}F_{0.7}$ | 8.34 | 2.2 | 56 | 58 | 838 | 0.6 |
| $CuFe_2O_4$ | 8.50 | 1.3 | 30 | 25 | 728 | ---- |
| $Cu_{0.3}Fe_{2.4}O_{3.3}F_{0.7}$ | 8.50 | 1.3 | 30 | 25 | 698 | 0.3 |
| $ZnFe_2O_4$ | 8.44 | 0.0 | 0 | 0 | ---- | ---- |
| $Zn_{0.5}Fe_{2.2}O_{3.3}F_{0.7}$ | 8.44 | 3.8 | 96 | 67 | 703 | 0.3 |
| $CdFe_2O_4$ | 8.69 | 0.0 | 0 | 0 | ---- | ---- |
| $Cd_{0.3}Fe_{2.4}O_{3.3}F_{0.7}$ | 8.69 | 3.6 | 85 | 56 | 683 | 0.3 |

In the following Table II the chemical composition of the fluorine-containing ferrites of this invention mentioned in Table I are given:

TABLE II

[Chemical composition (wt. percent), calculated and measured density of some fluorine containing spinel-type ferrites $M_aFe_bO_{(4-x)}F_x$]

| | Chemical Composition | | | | Formula Wt., g. | Crystal Vol., Cu. A. | Density Calcu. Meas'd | |
|---|---|---|---|---|---|---|---|---|
| | M Percent | $Fe^{++}$ Percent | Fe, Percent (tot) ($Fe^{++}+Fe^{+++}$) | F Percent | | | g./cm.³ | g./cm.³ |
| $Mg_{0.8}Fe_2O_{3.3}F_{0.7}$ | 9.6 | 8.6 | 57.6 | 6.6 | 197 | 584 | 4.45 | 4.40 |
| $Mn_{0.4}Fe_{2.2}O_{3.3}F_{0.7}$ | 10.4 | 2.6 | 58.3 | 6.1 | 211 | 614 | 4.57 | 4.60 |
| $Co_{0.8}Fe_{2.0}O_{3.3}F_{0.7}$ | 20.7 | 7.5 | 50.1 | 5.7 | 226 | 588 | 5.10 | 5.00 |
| $Ni_{0.8}Fe_{1.8}O_{3.3}F_{0.7}$ | 20.8 | | 49.0 | 5.9 | 219 | 580 | 5.05 | 5.00 |
| $Cu_{0.3}Fe_{2.4}O_{3.3}F_{0.7}$ | 8.5 | 12.5 | 61.2 | 5.3 | 220 | 586 | 4.95 | 5.00 |
| $Zn_{0.5}Fe_{2.2}O_{3.3}F_{0.7}$ | 14.4 | 7.7 | 55.9 | 5.8 | 222 | 602 | 4.91 | 4.90 |
| $Cd_{0.3}Fe_{2.4}O_{3.3}F_{0.7}$ | 14.4 | 12.0 | 57.5 | 5.5 | 235 | 655 | 4.70 | 4.90 |

The invention is further illustrated by the following examples to which it is not limited. Temperatures are indicated in degrees centigrade.

Example 1

23.8 g. of $CoCl_26H_2O$ was dried overnight in a drying oven at a temperature of 110°, whereby it lost all the water of crystallization. The anhydrous chloride was dissolved in about 100 ml. of absolute methanol and the solution was admixed with a solution of 14 g. of dry $NH_4F$ in 200 ml. of absolute methanol. From the combined solutions an ammonium-cobalto-fluoride salt, $CoF_2.2NH_4$ of pink colour precipitated spontaneously. The precipitate was filtered and washed with absolute methanol until no chloride ion could be found in the filtrate by the $AgNO_3$ test. The filter residue was then dried at 150° whereby some $NH_4F$ was volatilized. The dried anhydrous cobaltous fluoride still contained some $NH_4F$. 2.07 g. of this salt was mixed with 1.85 g. of $Fe_2O_3$, the mixture was compressed to form a pellet and the latter was fired at 1200° for 2 hours in a dry carbon dioxide atmosphere. The product was a pure single-phase spinellic ferrite which had a magnetic moment of 86 cgs./g. It contained 5.7% of fluorine and its empirical composition corresponded to the formula $$Co_{0.8}^{++}Fe_{0.3}^{++}Fe_{1.7}^{+++}O_{3.3}F_{0.7}$$

Example 2

23.8 g. of $NiCl_2.6H_2O$ was heated and freed from water of crystallization, the anhydrous salt was converted into the complex salt, $NiF_2.2NH_4F$, and the latter was heated and partly freed of $NH_4F$, all this in analogy to Example 1.

2 g. of the heat-treated complex salt was mixed with 1.85 g. of $Fe_2O_3$, the mixture was compressed into a pellet, and the pellet was fired at 1200° for 2 hours in an atmosphere of dry carbon dioxide. The product was a pure single-phase pinellic ferrite which had a magnetic moment of 50 cgs./g. It contained 5.9% of fluorine and its empirical composition corresponded to the formula $$Ni_{0.8}Fe_{1.9}O_{3.3}F_{0.7}$$

Example 3

19.8 g. of $MnCl_2.4H_2O$ was processed, and the heat-treated complex salt mixed with 2.35 g. of $Fe_2O_3$ and further processed, as described in Example 1. The single-phase spinellic ferrite thus produced had a magnetic moment of 75 cgs./g., a fluorine content of about 6.4% and the empirical formula $$Mn_{0.4}^{++}Fe_{0.1}^{++}Fe_{2.1}^{+++}O_{3.3}F_{0.7}$$

Example 4

A mixture of 6.2 g. of $MgF_2$ and 16 g. of $Fe_2O_3$ was compressed to form a pellet and the latter was fired at 1200° for 2 hours in a dry carbon dioxide atmosphere. The pure single-phase spinellic ferrite thus produced had a magnetic moment of 47 cgs./g., a fluorine content of about 6.6% and the empirical formula $$Mg_{0.8}{}^{++}Fe_{0.3}{}^{++}Fe_{1.7}{}^{+++}O_{3.3}F_{0.7}$$

*Example 5*

A mixture of 9.3 g. of $MnF_2$ and 16 g. of $Fe_2O_3$ was processed in the manner described in Example 5. The pure single-phase spinellic ferrite thus produced had a magnetic moment of 75 cgs./g., a fluorine content of about 6.2% and the empirical formula $$Mn_{0.4}{}^{++}Fe_{0.1}{}^{++}Fe_{2.1}{}^{+++}O_{3.3}F_{0.7}$$

*Example 6*

A mixture of 15 g. of $CdF_2$ and 16 g. of $Fe_2O_3$ was processed in the manner described in Example 5 (firing temperature 1250°). The pure single-phase spinellic ferrite thus produced had a magnetic moment of 59 cgs./g., a fluorine content of about 5.5% and the empirical formula $Cd_{0.3}{}^{++}Fe_{0.5}{}^{++}Fe_{1.9}{}^{+++}O_{3.3}F_{0.7}$.

*Example 7*

From 24.4 g. of $ZnCl_2 \cdot 6H_2O$, the zinc fluoride-ammonium fluoride complex salt was prepared as described in Examples 1 and 3. A mixture of 6.55 g. of the heat-treated complex salt aforesaid, 4.65 g. of $MnF_2$ and 16 g. of $Fe_2O_3$ was compressed to form a pellet, which was fired at 1200° for 2 hours in a dry carbon dioxide atmosphere. The pure single-phase spinellic ferrite thus produced had a magnetic moment of 75 cgs./g., a fluorine content of about 6% and the empirical formula $$Mn_{0.3}{}^{++}Zn_{0.3}{}^{++}Fe_{0.2}{}^{++}Fe_{1.9}{}^{+++}O_{3.3}F_{0.7}$$

We claim:

1. A single-phase spinel-type ferrite containing from 4 to 12% by weight of fluorine and having the formula $$M_a{}^{++}Fe_b{}^{+++}\Delta_c O_{(4-x)}F_x$$

wherein $M^{++}$ is at least one bivalent metal cation selected from the group consisting of Mg, Zn, Cd, Cu, Mn, Fe, Ni and Co, $\Delta$ is a cation vacancy in the crystal lattice and $a$, $b$, $c$ and $x$ are positive numbers fulfilling the equations $$a+b+c=3$$

and $$2a+3b=2(4-x)+x$$

2. A single-phase spinel-type ferrite of the formula $$Co_{0.8}{}^{++}Fe_{0.3}{}^{++}Fe_{1.7}{}^{+++}O_{3.3}F_{0.7}$$

3. A single-phase spinel-type ferrite of the formula $$Ni_{0.8}Fe_{1.9}O_{3.3}F_{0.7}$$

4. A single-phase spinel-type ferrite of the formula $$Mn_{0.4}{}^{++}Fe_{0.1}{}^{++}Fe_{2.1}{}^{+++}O_{3.3}F_{0.7}$$

5. A single-phase spinel-type ferrite of the formula $$Mg_{0.8}{}^{++}Fe_{0.3}{}^{++}Fe_{1.7}{}^{+++}O_{3.3}F_{0.7}$$

6. A single-phase spinel-type ferrite of the formula $$Mn_{0.4}{}^{++}Fe_{0.1}{}^{++}Fe_{2.1}{}^{+++}O_{3.3}F_{0.7}$$

7. A single-phase spinel-type ferrite of the formula $$Cd_{0.3}{}^{++}Fe_{0.5}{}^{++}Fe_{1.9}{}^{+++}O_{3.3}F_{0.7}$$

8. A single-phase spinel-type ferrite of the formula $$Mn_{0.3}{}^{++}Zn_{0.3}{}^{++}Fe_{0.2}{}^{++}Fe_{1.9}{}^{+++}O_{3.3}\ F_{0.7}$$

9. A process for the manufacture of a single-phase spinel-type ferrite having the formula $$M'_a{}^{++}Fe_b{}^{+++}\Delta_c O_{(4-x)}F_x$$

wherein M′ is at least one bivalent metal cation selection from the group consisting of Zn, Fe, Ni and Co and $a$, $b$, $c$, $x$ and $\Delta$ are as defined in claim 1, which comprises mixing an anhydrous complex fluoride of said bivalent metal cation and ammonium ion with ferric oxide, and firing the resulting mixture at a temperature of about 1200° C. in a substantially oxygen-free atmosphere constituted of a member selected from the group consisting of carbon dioxide, nitrogen and an inert gas to produce said ferrite.

10. The process as defined in claim 8, in which said complex fluoride is heated to liberate ammonia prior to mixing the same with ferric oxide.

11. A process for the manufacture of a single-phase spinel-type ferrite having the formula $$M''_a{}^{++}Fe_b{}^{+++}\Delta_c O_{(4-x)}F_x$$

wherein M″ is at least one bivalent metal cation selected from the group consisting of Mg, Cd, Cu and Mn and $a$, $b$, $c$, $x$ and $\Delta$ are as defined in claim 1, which comprises mixing M″$F_2$ and ferric oxide and firing the resulting mixture at a temperature of about 1200° C. in a substantially oxygen-free atmosphere constituted of a member selected from the group consisting of carbon dioxide, nitrogen and an inert gas.

References Cited by the Examiner

UNITED STATES PATENTS

| | | | |
|---|---|---|---|
| 2,893,830 | 7/1959 | Brixner | 252—62.5 X |
| 2,962,345 | 11/1960 | Brixner | 252—62.5 X |
| 3,007,875 | 11/1961 | Albers-Schoenberg | 252—62.5 |
| 3,093,453 | 6/1963 | Frei et al. | 252—62.5 X |

TOBIAS E. LEVOW, *Primary Examiner.*

MAURICE A. BRINDISI, *Examiner.*